United States Patent
Ishihara

(10) Patent No.: US 8,867,888 B2
(45) Date of Patent: Oct. 21, 2014

(54) RECORDING APPARATUS FOR SIMULTANEOUSLY RECORDING THE SAME MOVING IMAGE TO A PLURALITY OF RECORDING MEDIA

(71) Applicant: Canon Kabushiki Kaisha, Tokyo (JP)

(72) Inventor: Akihito Ishihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/652,245

(22) Filed: Oct. 15, 2012

(65) Prior Publication Data

US 2013/0094832 A1    Apr. 18, 2013

(30) Foreign Application Priority Data

Oct. 18, 2011    (JP) ................................. 2011-228844

(51) Int. Cl.
| | | |
|---|---|---|
| *H04N 5/775* | (2006.01) | |
| *H04N 5/76* | (2006.01) | |
| *H04N 5/77* | (2006.01) | |
| *H04N 5/445* | (2011.01) | |
| *H04N 9/80* | (2006.01) | |
| *G06F 3/048* | (2013.01) | |
| *G11B 27/00* | (2006.01) | |
| *H04N 9/804* | (2006.01) | |
| *G11B 27/34* | (2006.01) | |
| *G11B 27/034* | (2006.01) | |

(52) U.S. Cl.
CPC ............ *G11B 27/002* (2013.01); *H04N 9/8042* (2013.01); *G11B 27/34* (2013.01); *G11B 27/034* (2013.01)

USPC ........... 386/230; 386/225; 386/259; 386/291; 348/231.2; 348/231.8; 715/781; 725/58

(58) Field of Classification Search
USPC ............ 386/230, 225, 259, 291, 344, E5.043, 386/E5.07; 348/231.2, 231.8, 333.02, 348/E5.103; 715/781; 725/58
See application file for complete search history.

(56) References Cited

U.S. PATENT DOCUMENTS

| 7,869,689 B2 * | 1/2011 | Lee ............................... 386/291 |
| 7,995,130 B2 * | 8/2011 | Ishibashi et al. ......... 348/333.02 |
| 2005/0019012 A1 * | 1/2005 | Furuta ............................. 386/83 |

FOREIGN PATENT DOCUMENTS

JP          07-231420 A    8/1995

* cited by examiner

Primary Examiner — Thai Tran
Assistant Examiner — Syed Hasan
(74) *Attorney, Agent, or Firm* — Canon USA, Inc., IP Division

(57) ABSTRACT

A recording apparatus includes an input unit configured to input moving image data, a recording unit configured to record the moving image data input by the input unit to a plurality of recording media, an output unit configured to output information to a display device, a selection unit configured to select any of a plurality of modes including a first mode for simultaneously recording the moving image data input by the input unit to the plurality of recording media, and a control unit configured, when a last clip is recorded in the first mode from the moving image data of a plurality of clips recorded to the plurality of recording media, to control the output unit to output a selection screen for selecting any of the plurality of recording media, and erase the moving image data of the last clip from the selected recording medium.

11 Claims, 3 Drawing Sheets

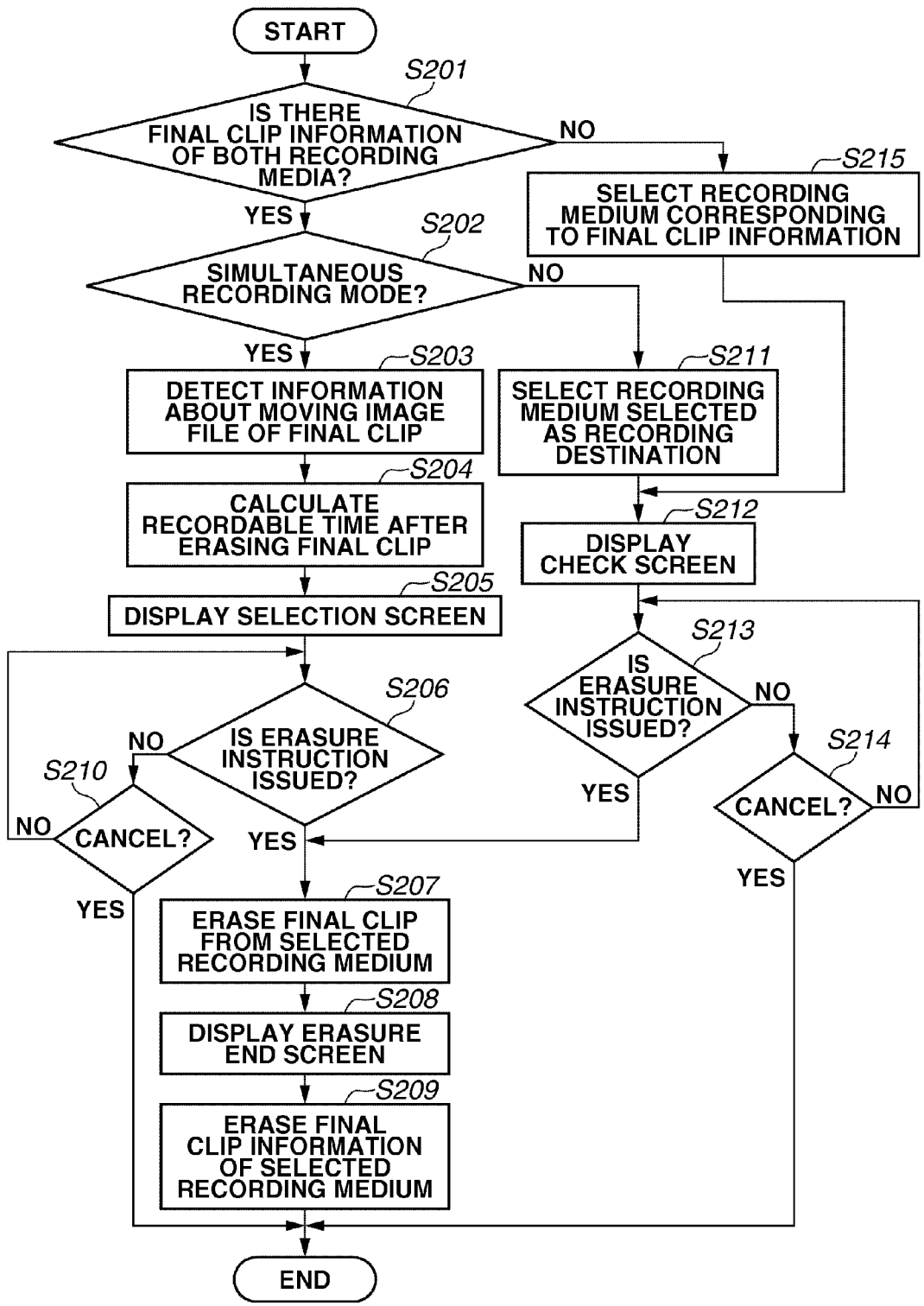

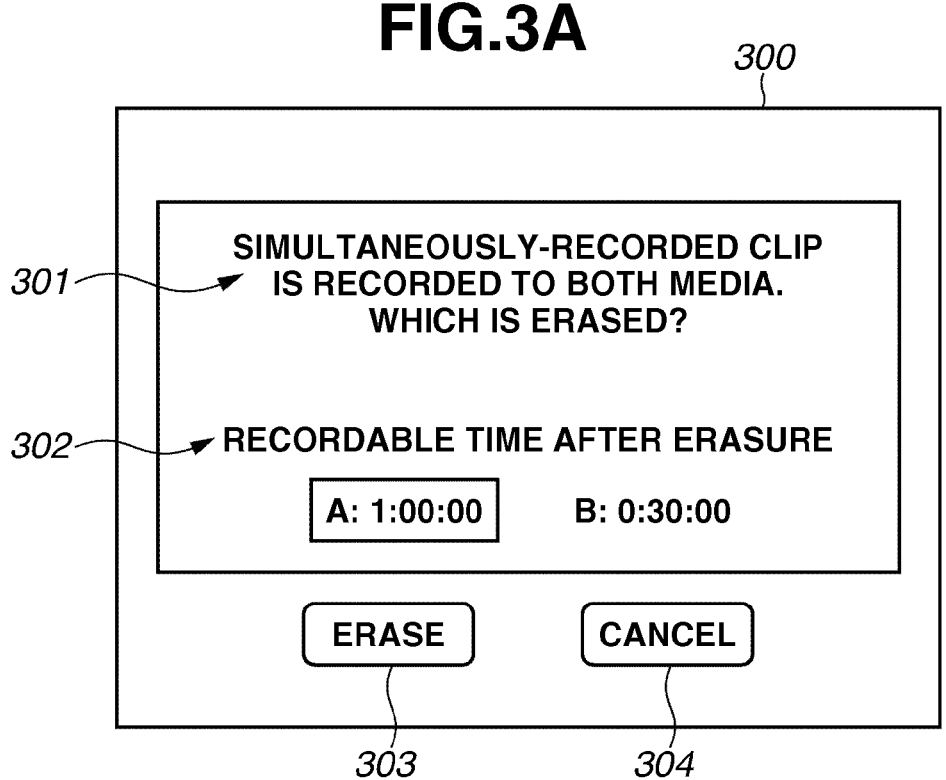
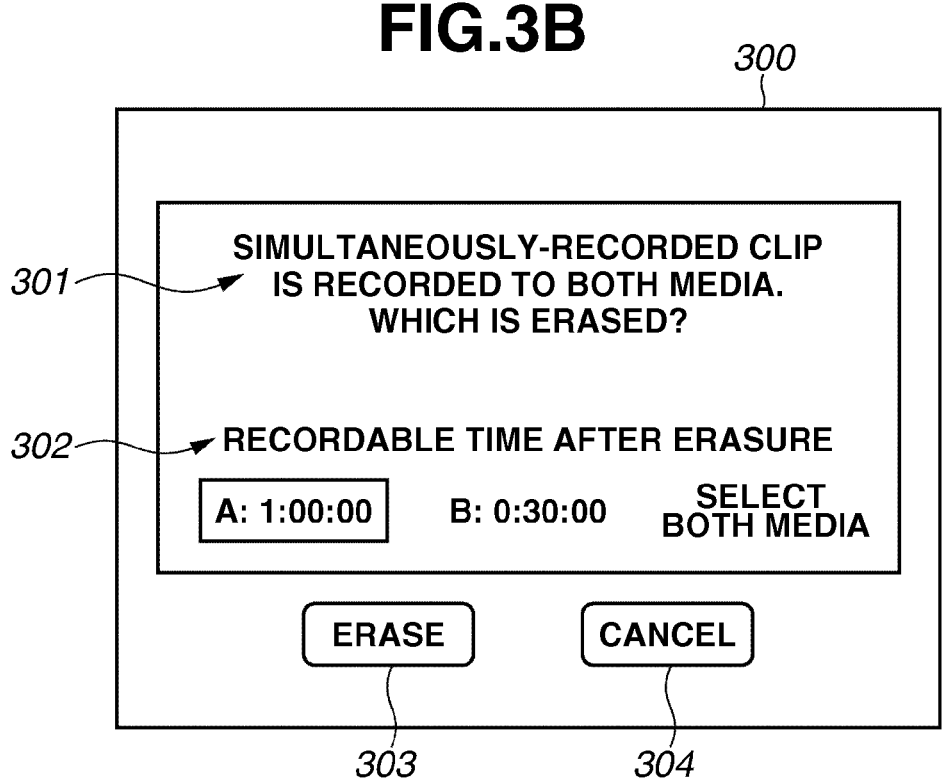

RECORDING APPARATUS FOR SIMULTANEOUSLY RECORDING THE SAME MOVING IMAGE TO A PLURALITY OF RECORDING MEDIA

BACKGROUND OF THE INVENTION

1. Field of the Invention

The present invention relates to a recording apparatus, in particular, a preferable technique used for a recording apparatus that simultaneously records the same moving image to a plurality of recording media.

2. Description of the Related Art

Conventionally, a recording apparatus for recording an image signal and an audio signal to a recording medium is well known. Further, Japanese Patent Application Laid-Open No. 07-231420 discusses a recording apparatus that has a function for simultaneously recording the same image to a plurality of recording media. If an image recorded to a part of a plurality of recording media is not correctly reproduced, the same image can be reproduced from another recording medium by recording the same image to the plurality of recording media.

As described above, when erasing the image that is simultaneously recorded to the plurality of recording media, a user needs to search the simultaneously recorded image from the recording media and individually erase the image. This is a problem that is excessively troublesome.

When erasing an image simultaneously-recorded to two recording media from one recording medium and remaining the image in the other recording medium without erasure, the user similarly needs to reproduce the image from the recording medium to which the image for erasure is recorded, search the simultaneously-recorded image, and then erase the searched image.

SUMMARY OF THE INVENTION

The present invention is directed to enabling easy selection of a desired recording medium and erasure thereof when erasing image data that is simultaneously recorded to a plurality of recording media.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates a flowchart of an example of last clip erasure processing.

FIGS. 3A and 3B illustrate examples of a selection screen.

DESCRIPTION OF THE EMBODIMENTS

Figure 1:
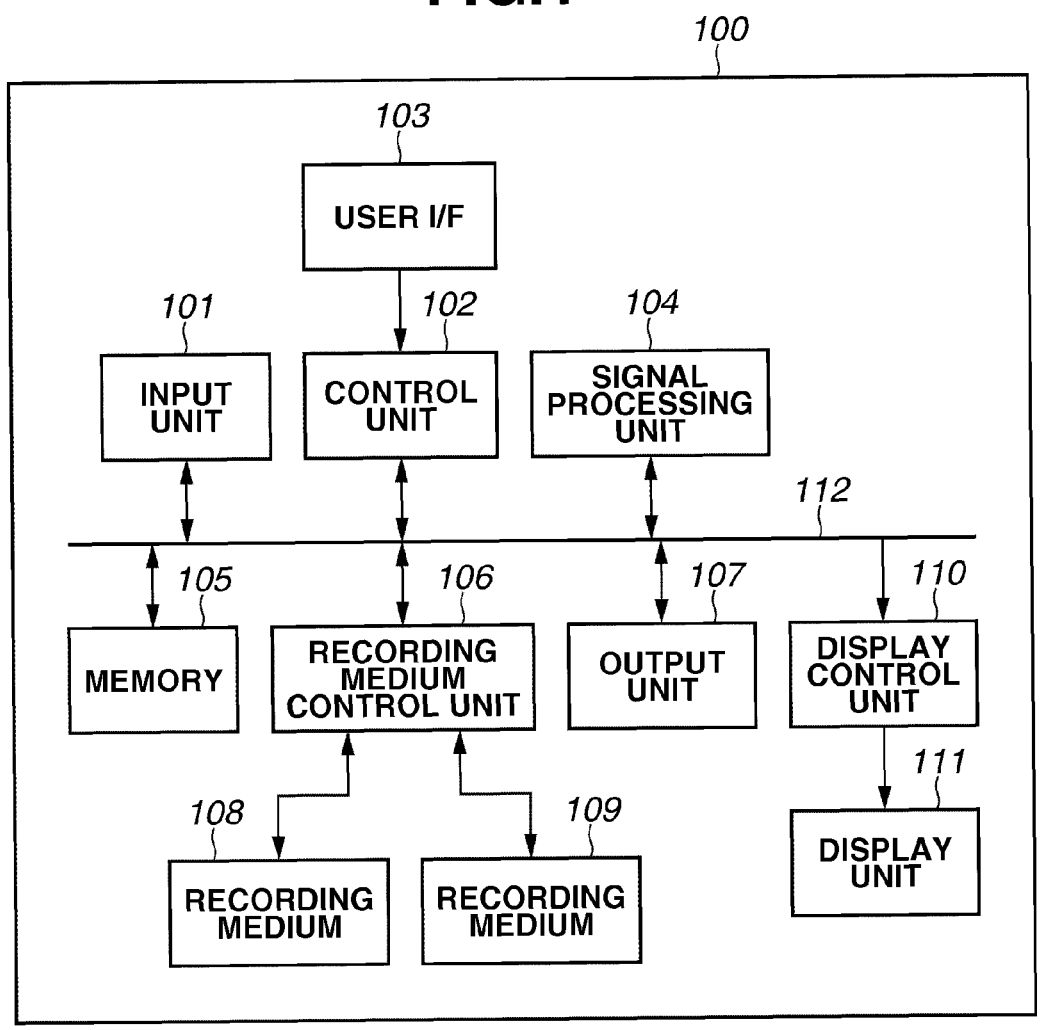
FIG. 1 illustrates a block diagram of a configuration example of a recording apparatus according to an exemplary embodiment of the present invention.

Various exemplary embodiments, features, and aspects of the invention will be described in detail below with reference to the drawings.

A first exemplary embodiment of the present invention will be described. FIG. 1 illustrates a block diagram of a configuration example of a recording apparatus 100 according to the present exemplary embodiment. Referring to FIG. 1, an input unit 101 acquires and outputs moving image data and audio data. According to the present exemplary embodiment, the input unit 101 inputs the moving image data or the audio data supplied from outside of the recording apparatus 100. Alternatively, the input unit 101 may include an image pickup unit or a microphone to acquire a shot moving image or the audio data via the microphone.

A control unit 102 controls the entire operation of the recording apparatus 100 according to an input from a user interface (UI) 103. The control unit 102 includes a microcomputer (central processing unit (CPU)) or a memory, and controls the recording apparatus 100 under a program (software) stored in the memory (not illustrated). The control unit 102 also includes a recording medium interface (IF) for communication of data or a command with a recording medium control unit 106.

The UI 103 includes various switches operable by the user. The UI 103 receives various instructions from the user, and notifies the control unit 102 of the received instructions. The UI 103 further includes a power switch, a switch for instructions of the start or stop of recording, or a switch for changing a mode of the recording apparatus 100.

A signal processing unit 104 encodes the moving image data and audio data input by the input unit 101 in a well-known coding format such as a moving picture experts group (MPEG) at a recording time to compress an information amount. Further, the signal processing unit 104 performs processing necessary for recording the moving image data or the audio data. The signal processing unit 104 also decodes the reproduced moving image data and audio data at a reproduction time to decompress the information amount. Furthermore, the signal processing unit 104 outputs information about a code amount (data amount) of the encoded moving image data and audio data to the control unit 102 at the recording time.

A memory 105 stores the moving image data and the audio data. Blocks in the recording apparatus 100 access the memory 105, thereby processing necessary moving image data and audio data. The memory 105 also stores various information such as information about a file system or management information as well as the moving image data or the audio data. Further, the memory 105 functions as a work memory for control by the control unit 102. For example, the memory 105 is a volatile memory such as a dynamic random access memory (DRAM).

The recording medium control unit 106 records and reproduces, to a recording medium 108 or 109, the moving image data and the audio data, or various information. The recording medium control unit 106 also records the moving image data and audio data stored in the memory 105 to the recording medium 108 or 109 at the recording time. Further, the recording medium control unit 106 reproduces the moving image data or the audio data from the recording medium 108 or 109 at the reproduction time, and stores the reproduced data to the memory 105. According to the present exemplary embodiment, the recording media 108 and 109 are mutually independent, and are random access memories such as hard disk drives (HDDs) or flash memory cards.

The recording medium control unit 106 manages the moving image or the audio data, or various information recorded to the recording medium 108 or 109, as a file under a file system such as a file allocation table (FAT). The recording medium control unit 106 includes a well-known interface (IF)

such as advanced technology attachment (ATA), and communicates data or various commands with the recording medium IF in the control unit 102.

The recording medium control unit 106 further detects whether each of the recording media 108 and 109 are loaded, and notifies the control unit 102 of the detecting result. With a loading/unloading mechanism (not illustrated), the recording media 108 and 109 are easily loaded or unloaded to/from the recording apparatus 100. Alternatively, each of the recording media 108 and 109 may be included in the recording apparatus 100 or one of the recording media 108 and 109 may be included therein.

When writing and reading the moving image file to the recording medium 108 or 109, the control unit 102 controls the recording medium control unit 106 to reproduce file system data (management data) from the recording medium 108 or 109 and store the reproduced data to the memory 105. The file system data indicates a file name, a file size, or a recording address of the data recorded to the recording medium 108 or 109, and is also management information for managing the file. The control unit 102 also controls writing and reading of the file according to the read file system data.

The control unit 102 updates the file system data stored to the memory 105 according to the file writing state to the recording medium 108 or 109. The recording medium control unit 106 records the updated file system data to the recording medium 108 or 109. The control unit 102 generates a management file of each of the moving image files recorded to the recording medium 108 or 109. The management file includes the size (information amount) of each of the moving image files, mode information for identifying that the data is recorded in a simultaneous recording mode, or information such as a universal unique identifier (UUID). The mode information and the UUID may be stored to each of the moving image file and be recorded as additional information about each of the moving image file.

According to the present exemplary embodiment, the UUID is generated to the moving image file recorded to the recording medium 108 or 109. The UUID is identification information for uniquely identifying each of the moving image file. The control unit 102 generates the UUID with a different value every time when a new moving image file is generated. The information about the UUID is stored to the management file corresponding to the moving image file, and is recorded to the recording medium 108 or 109. Therefore, by checking the value of the UUID recorded to the recording medium 108 or 109, each of the moving image file can be easily identified.

The user operates the UI 103, thereby issuing an instruction for switching an operational mode of the recording apparatus 100 or starting or stopping the recording of the moving image data. According to the present exemplary embodiment, when loading the two recording media 108 and 109, the user arbitrarily selects one of the recording media 108 and 109 by operating the UI 103. The moving image data is recorded to the selected recording media 108 or 109. Further, according to the present exemplary embodiment, when loading the two recording media 108 and 109, it can be instructed that the input moving image data is simultaneously recorded to the two recording media 108 and 109.

An output unit 107 outputs the reproduced moving image data and audio data, or information about a selection screen to a display device that is externally disposed to the recording apparatus 100. The display control unit 110 generates a moving image or various information in response to an instruction from the control unit 102, and outputs the generated data to a display unit 111 such as a liquid crystal panel. A data bus 112 is used for receiving and transmitting data or various control commands from/to units in the recording apparatus 100.

A recording operation will be described according to the present exemplary embodiment. First, the user operates the UI 103, thereby outputting an instruction for shifting the mode to a recording mode of the moving image data. Then, the control unit 102 shifts the recording apparatus 100 to a recording standby state, and waits for an instruction for starting the recording. At a time for turning on the power or in the recording standby state, the control unit 102 is notified by the recording medium control unit 106 that the recording medium 108 and 109 are loaded. Then, the control unit 102 instructs the recording medium control unit 106 to execute the mounting processing.

The recording medium control unit 106 receives an instruction for the mounting processing. Then, the recording medium control unit 106 communicates with a controller of the recording medium 108 and 109, and reads out the file system data. The recording medium control unit 106 further checks contents of the read out file system, thereby checking whether data is normally recorded and reproduced to the recording medium 108 or 109. At this time, the recording medium control unit 106 checks information such as the remaining recording amount of the recording medium 108 and 109. The recording medium control unit 106 reads out information about a writing speed of the recording medium 108 and 109 therefrom in the mounting processing, and stores the read out information to the memory 105.

The checking processing using the file system data ends. Then, the recording medium control unit 106 reads the management file from each of the recording medium 108 and 109, and stores the management file to the memory 105. When the recording media 108 and 109 are unloaded from the recording apparatus 100, the recording medium control unit 106 notifies the control unit 102 of the unloading state. The control unit 102 erases the file system data and the management file about the unloaded recording media 108 and 109 from the memory 105, and invalidates the erased data and file.

After ending the mounting processing of the recording media 108 and 109, in the recording standby state, a moving image of the moving image data input from the input unit 101 is displayed on the display unit 111. When an instruction for starting the recording is input via the UI 103, the control unit 102 instructs the signal processing unit 104 to start the encoding processing. The signal processing unit 104 reads the moving image data and the audio data, input by the input unit 101 and stored in the memory 105, and starts to encode the moving image data and the audio data. The signal processing unit 104 also stores the encoded data to the memory 105.

According to the present exemplary embodiment, the total data rate of the moving image data and the audio data encoded by the signal processing unit 104 is lower than a data rate recordable to the recording media 108 and 109. Therefore, the signal processing unit 104 temporarily stores the encoded moving image data and audio data to the memory 105. Each time when the data amount of encoded data stored in the memory 105 reaches a first predetermined amount, the recording medium control unit 106 reads out the encoded data from the memory 105, and records the read out data to one of the recording media 108 and 109 selected by the user. When the encoded data stored in the memory 105 is reduced to a second predetermined amount smaller than the first predetermined amount, the recording medium control unit 106 suspends the reading out of the encoded data from the memory 105, and interrupts the recording processing to the recording media 108 and 109. The recording medium control unit 106 repeats writing processing of the encoded data to the recording media 108 and 109. At this time, when the file is not opened, the recording medium control unit 106 generates a file for newly recording the encoded data on the recording medium 108 or 109 of the recording destination, and stores and records the encoded data to the moving image file.

Each time when ending one-time writing to the recording medium 108 or 109, the control unit 102 updates the file system data (management information) stored in the memory 105 based on a recording position of the currently-written encoded data. The control unit 102 controls the recording medium control unit 106 to read out the updated file system data from the memory 105, and records the data to the recording media.

The control unit 102 generates the UUID having a value of a predetermined bit length with a well-known method by combining an individual number of the recording apparatus 100, a recording date, and a prepared random number, and stores the UUID to the management file stored in the memory 105. The control unit 102 generates the UUID having a different value in response to the instruction for starting the recording each time when the moving image file is newly generated. As will be described later, when simultaneously recording the same data to the two recording media 108 and 109, the UUID having the same value is added to each of the moving image files.

The control unit 102 stores information about the file name or the file number of the moving image file as last clip information to the memory 105 in response to the instruction for starting the recording each time when the moving image file is newly generated.

When receiving the instruction for stopping the recording from the UI 103 during recording the moving image, the control unit 102 stops the encoding of the moving image data and the audio data with the signal processing unit 104, and closes the file in progress of the recording by stopping the recording of the encoded data with the recording medium control unit 106. The control unit 102 changes reproduction order by the management files (control information) to reproduce a plurality of moving image files including the currently-recorded moving image file in the recording order. The control unit 102 instructs the recording medium control unit 106 to record the data to the recording medium. According to the present exemplary embodiment, a plurality of files for recording a series of moving images recorded during a period from the instruction for starting the recording to the instruction for stopping the recording is managed as one clip (scene). The moving image data is recorded to the selected recording media from the two recording media 108 and 109.

Processing at the time of the reproduction will be described. When an instruction for switching the reproduction mode is issued via the UI 103, the control unit 102 detects a plurality of scenes recorded to the selected one of the recording media 108 and 109 to the recording medium control unit 106. The head moving image file of each of the scenes is reproduced, and one head screen is decoded by the signal processing unit 104 and is stored to the memory 105. The signal processing unit 104 reduces the image signal of the decoded head screen, and generates a representative image of each of the scenes. An index screen having the representative images of the plurality of scenes is generated, and is displayed on the display unit 111.

The user selects a desired representative image from the representative images displayed on the index screen by operating the UI 103, and issues a reproduction instruction. When receiving the reproduction instruction, the control unit 102 controls the recording medium control unit 106 to reproduce at least one moving image file of the scene corresponding to the selected representative image. The recording medium control unit 106 reproduces the moving image file of the designated scene from the recording medium 108 or 109. The signal processing unit 104 decodes the reproduced moving image file and outputs the decoded file to the display control unit 110, and the output unit 107 externally outputs the file.

The simultaneous recording will be described. According to the present exemplary embodiment, there are a normal recording mode for selecting one of the recording media 108 and 109 and recording the moving image file to the selected one of the recording media 108 and 109 and a simultaneous recording mode. In the simultaneous recording mode, the moving image data and the audio data input by the input unit 101 is simultaneously recorded to the two recording media 108 and 109. In this case, the same encoded data is recorded to each of the recording media 108 and 109. Therefore, the timing for file division in the recording media 108 and 109 is identical. Thus, the recorded file is also identical.

In the recording standby state, the user sets the simultaneous recording mode by operating the UI 103. Then, the control unit 102 designates the two recording media 108 and 109 as the recording media of the recording destination. When the user inputs the instruction for starting the recording by operating the UI 103 in this state, the control unit 102 controls the signal processing unit 104 to readout the moving image data and the audio data, input by the input unit 101 and stored to the memory 105 and start the encoding of the moving image data and the audio data. The signal processing unit 104 stores the encoded data to the memory 105.

The control unit 102 newly generates the moving image file to the recording media 108 and 109, and issues an instruction for storing the encoded data to the moving image file generated to the recording media 108 and 109 and writing the data to the recording media 108 and 109 to the recording medium control unit 106. The control unit 102 generates the UUID, and stores the UUID to the management file in the memory 105. The recording medium control unit 106 stores the management file read out from the recording media 108 and 109 to the memory 105 in the mounting processing. In the simultaneous recording, the recording medium control unit 106 stores information about the UUID to the management files of each of the recording media 108 and 109. Further, the control unit 102 generates mode information for identifying the moving image file recorded in the simultaneous recording mode, and stores the mode information to the management files of each of the recording media 108 and 109, corresponding to the moving image file in progress of the recording.

The moving image files are recorded to the recording media 108 and 109. When the instruction for suspending the recording via the UI 103 during recording the moving image file is issued, the control unit 102 suspends the encoding of the moving image and audio data with the signal processing unit 104, and issues the instruction for suspending the recording to the recording medium control unit 106. The recording medium control unit 106 closes the file in progress of the recording to the recording media 108 and 109 in response to the instruction for suspending the recording, and suspends the recording.

The control unit 102 changes the information in the reproduction order stored in the management file in the memory 105. The control unit 102 issues an instruction for recording the management file including the UUID and the mode information to the recording media 108 and 109 to the recording medium control unit 106. The recording medium control unit 106 reads out the management file from the memory 105, and records the file to the recording media 108 and 109.

The control unit 102 also generates a new moving image file in the simultaneous recording mode in response to the instruction for starting the recording, and detects the information about the file name or the file number of the moving image file generated to the recording media 108 and 109. Further, the control unit 102 stores the information about the file name of the moving image file or the file number as the last clip information in the recording media 108 and 109 to the memory 105.

According to the present exemplary embodiment, the control unit 102 erases and invalidates the last clip information stored in the memory 105 in response to an instruction for switching the recording mode (including the normal recording mode and the simultaneous recording mode) to the reproduction mode or an instruction for turning off the power. When the recording medium 108 or 109 is unloaded from the recording apparatus 100, the control unit 102 also erases the last clip information about the unloaded recording medium 108 or 109 from the memory 105.

According to the present exemplary embodiment, in any of the recording standby state and the reproduction mode, the user may add a mark to a desired moving image file from among the moving image files recorded to the recording media 108 and 109 by operating the UI 103. If an instruction for adding the mark is issued, the control unit 102 stores the file name or the file number of the moving image file selected by the user and the mark information with a corresponding relation therebetween to the management file in the memory 105. Further, the control unit 102 issues an instruction for recording the management file to the recording media 108 and 109 at a predetermined timing to the recording medium control unit 106.

At the time of the reproduction, the control unit 102 simply searches the file designated by the user based on the mark information stored in the management file, and allows the display unit 111 to display the information about the file name.

Last clip erasure processing will now be described according to the present exemplary embodiment. When an instruction for erasing the moving image file (last clip) recorded lastly to the recording medium 108 or 109 is issued, the recording apparatus 100 has a last clip erasure function for detecting the last clip and erasing the detected clip from the recording medium 108 or 109. When the user checks the moving image that is recorded immediately before and then determines that the moving image is not necessary, the moving image that is recorded immediately before can be easily erased by using the last clip erasure function. FIG. 2 illustrates a flowchart of the last clip erasure processing. The processing in FIG. 2 is executed by controlling the units by the control unit 102.

In a shooting standby state, the UI 103 issues an instruction for erasing the last clip and the processing in FIG. 2 then starts. In step S201, the control unit 102 detects whether the last clip information corresponding to each of the recording media 108 and 109 is stored to the memory 105.

If the last clip information corresponding to both the recording media 108 and 109 is stored to the memory 105 (YES in step S201), in step S202, the control unit 102 determines whether the last clips of the recording media 108 and 109 are recorded in the simultaneous recording mode. The determination is performed based on the last clip information stored in the memory 105 and the mode information about the management file of the recording media 108 and 109.

If the lastly recorded last clip is recorded in the simultaneous recording mode in the recording media 108 and 109 (YES in step S202), the last clips of the recording media 108 and 109 are simultaneously recorded moving image files. In step S203, the control unit 102 detects the information about the moving image file of the last clip of one of the recording media 108 and 109 based on the management file stored in the memory 105.

In step S204, the control unit 102 detects the size of the moving image file from the information about the moving image file of the last clip, and calculates a recordable time after erasing the moving image file of the last clip from the recording media 108 and 109. The control unit 102 adds the size of the moving image file of the last clip to the remaining recording amount of the recording media 108 and 109, and calculates the recordable time by dividing the result by a total data rate of the moving image data and audio data to be recorded.

In step S205, the control unit 102 issues an instruction to the display control unit 110 to display on the display unit 111 the selection screen for allowing the user to select one of the recording media 108 and 109, and for checking whether the last clip of the selected one of the recording media 108 and 109 is erased. In this case, the selection screen also displays information about the recordable time after erasing the last clip from the recording media 108 and 109.

FIG. 3A illustrates an example of a selection screen 300. The selection screen 300 in FIG. 3A displays information 301 for notifying the user of a fact that the last clip is the simultaneously recorded clip and prompting the user to select one of the recording media 108 and 109. Further, the selection screen 300 displays information 302 of the recordable time of the recording media 108 and 109 after the erasure. Furthermore, the selection screen 300 displays an erasure icon 303 and a cancel icon 304.

In step S206, the control unit 102 determines whether the erasure instruction is issued after displaying the selection screen 300. If the user selects one of the recording media 108 and 109 by operating the UI 103 and issues the erasure instruction by selecting the erasure icon 303 (YES in step S206), in step S207, the control unit 102 issues, to the recording medium control unit 106, an instruction for erasing the moving image file of the last clip from the selected one of the recording media 108 and 109.

The recording medium control unit 106 erases the moving image file of the designated last clip from the selected one of the recording media 108 and 109. After ending the erasure, in step S208, the control unit 102 issues, to the display control unit 110, an instruction for displaying a screen indicating the end of erasure on the display unit 111. In step S209, the control unit 102 erases the last clip information corresponding to the selected one of the recording media 108 and 109 from the memory 105. In step S210, the erasure instruction is not issued in step S206 (NO in step S206) and the cancel is instructed by selecting the cancel icon 304 (YES in step S210). Then, the last clip erasure processing ends.

If the last clip information corresponding to only one of the recording media 108 and 109 is recorded (NO in step S201), in step S215, the control unit 102 selects the recording media corresponding to the last clip information. In a state in which one of the recording media 108 and 109 is loaded and the moving image is recorded, or in a state in which the moving image file is recorded to one of the recording media 108 and 109 in the normal recording mode after turning on the power, only the last clip information about the one of the recording media 108 and 109 is stored in the memory 105. In this case, the control unit 102 selects one of the recording media 108 and 109 to which the moving image is recorded immediately before. In step S212, the control unit 102 instructs the display control unit 110 to display a check screen on the display unit 111 for checking with the user whether the last clip of the selected one of the recording media 108 or 109, including information indicating the selected one of the recording media 108 and 109, is erased.

After displaying the check screen, in step S213, the control unit 102 determines whether the erasure instruction is issued. If the user issues the erasure instruction by operating the UI 103 (YES in step S213), in step S207, the control unit 102 issues an instruction to the recording medium control unit 106 for erasing the moving image file of the last clip from the selected one of the recording media 108 and 109 in step S215. The recording medium control unit 106 erases the moving image file of the designated last clip from the selected one of the recording media 108 and 109. In step S208, the control unit 102 issues an instruction to the display control unit 110 for displaying a screen indicating the erasure end on the display unit 111 after ending the erasure. In step S209, the control unit 102 erases the last clip information corresponding to the selected one of the recording media 108 and 109 from the memory 105. If the erasure instruction is not issued (NO in step S213), in step S214, it is checked whether the cancel instruction is issued. If the cancel instruction is issued (YES in step S214), the last clip erasure processing ends.

If at least one moving image file of the last clip of the recording media 108 and 109 is not recorded in the simultaneous recording mode (NO in step S202), in step S211, the currently selected one of the recording media 108 and 109 as the recording destination is selected from the recording media 108 and 109. If the moving image file is recorded in the simultaneous recording mode and then one of the recording media 108 and 109 is selected as the recording destination and is further recorded in the normal recording mode, the moving image file of the last clip of the one of the recording media 108 and 109 is in the normal recording mode. Further, one of the recording media 108 and 109 is selected as the recording destination and is recorded in the normal recording mode. Thereafter, if the other of the recording media 108 and 109 is changed as the recording destination and is recorded in the normal recording mode, the moving image file of the last clip of the selected one of the recording media 108 and 109 is in the normal recording mode.

In this case, the control unit 102 selects one of the recording media 108 and 109, currently-designated as the recording destination. In step S212, the control unit 102 issues an instruction to the display control unit 110 for displaying a check screen for checking with the user whether the last clip of the selected one of the recording media 108 and 109, including information indicating the selected one of the recording media 108 and 109, is erased.

In step S213, the user issues the erasure instruction by operating the UI 103 after displaying the check screen. In step S207, the control unit 102 issues an instruction to the recording medium control unit 106 for erasing the moving image file of the last clip from one of the recording media 108 and 109 selected in step S211. The recording medium control unit 106 erases the moving image file of the designated last clip from the selected one of the recording media 108 and 109. In step S208, the control unit 102 issues an instruction to the display control unit 110 for displaying a screen indicating the erasure end on the display unit 111 after ending the erasure. In step S209, the control unit 102 erases the last clip information corresponding to the selected one of the recording media 108 and 109 from the memory 105. If the erasure instruction is not issued (NO in step S214) and the cancel instruction is issued (YES in step S213), the last clip erasure processing ends. If the last clip information is not stored in the memory 105 (NO in step S201), the control unit 102 displays information on the display unit 111 for notifying the user that the last clip is not erased, and the processing ends.

According to the present exemplary embodiment, after simultaneously recording the moving image file to the two recording media 108 and 109 in the simultaneous recording mode, when the instruction for erasing the last clip is issued, the selection screen for allowing the user to select one of the recording media 108 and 109 is displayed. The moving image file of the last clip is erased from the one of the recording media 108 and 109 selected by the user. Therefore, the user can erase the moving image file of the last clip from a desired one of the recording media 108 and 109 with a simple operation after recording the moving image in the simultaneous recording mode. For example, after simultaneously recording the moving image file to each of the recording media for the purpose of backup, if the backup of the last clip is not required, according to the present exemplary embodiment, the moving image file of the last clip can be erased from the desired recording media with the simple operation.

Another exemplary embodiment of the present invention will be described. According to the first exemplary embodiment, the information about the recordable time of each the recording media is displayed on the selection screen 300 displayed in step S205. Alternatively, another information may be displayed on the selection screen 300.

The control unit 102 may detect the writing speed based on the information about the writing speed stored in the memory 105 at the time of the mounting processing and may display the information about the writing speed of each of the recording media on the selection screen 300. If compact flash (CF) cards are used as the recording media 108 and 109, the writing speed can be detected by using ultra direct memory access (UDMA) mode information or information about video performance guarantee (VPG). The UDMA mode information is standardized based on a transfer speed of direct memory access (DMA) on the CF card. The VPG is information for ensuring the speed class writing of the CF card.

The control unit 102 may detect the number of the moving image files added with the mark information from the moving image files of each of the recording media 108 and 109, and may display information about the number of marks corresponding to each of the recording media 108 and 109 on the selection screen 300.

A selection item for instructing the erasure of the last clip from both the recording media 108 and 109 may be displayed as well as a selection item for allowing the user to select one of the recording media 108 and 109. For example, as illustrated on the selection screen 300 in FIG. 3B, further, a selection item for erasure instruction of each of the last clip from both the recording media 108 and 109 is displayed. Thus, the user can instruct the erasure of the last clip from one of the recording media or both the recording media by using one check screen.

Another exemplary embodiment of the present invention will be described. The present invention can be realized by executing the following processing. That is, software (computer program) for realizing the functions according to the exemplary embodiments is supplied to a system or an apparatus via a network or various computer-readable non-transitory storage media. A computer (or a CPU or a microprocessor unit (MPU)) of the system or the apparatus reads out the program and executes the processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-228844 filed Oct. 18, 2011, which is hereby incorporated by reference herein in its entirety.

What is claimed is:

1. A recording apparatus comprising:
an input unit configured to input moving image data;
a recording unit configured to record the moving image data input by the input unit on a plurality of recording media;
an output unit configured to output information to a display device;
a selection unit configured to select any of a plurality of modes including a first mode for simultaneously recording the moving image data input by the input unit on the plurality of recording media;
a control unit configured, if moving image data of a last clip which is recorded lastly among a plurality of clips recorded on each of the plurality of recording media is recorded in the first mode, to control the output unit to output a selection screen for selecting any of the plurality of recording media, and erase the moving image data of the last clip from the recording medium selected from among the plurality of recording media displayed on the selection screen; and
a memory,
wherein the control unit stores mode information for identifying whether the moving image data recorded on the plurality of recording media is recorded in the first mode and last clip information for identifying the moving image data of the last clip in the memory, and determines, if an erasure instruction of the last clip is issued, whether each of the last clips of the plurality of recording media is recorded in the first mode by using the mode information and the last clip information stored in the memory.

2. The recording apparatus according to claim 1, wherein the control unit controls the output unit to display information about a remaining recording amount of the plurality of recording media on the selection screen.

3. The recording apparatus according to claim 1, wherein the plurality of modes includes a second mode for recording the input moving image data on one of the plurality of recording media and stopping the recording of the moving image data on another recording medium, and
wherein the mode information is information indicating one of the first mode and the second mode.

4. The recording apparatus according to claim 1, wherein the plurality of modes includes a second mode for recording the input moving image data on one recording medium of the plurality of recording media and stopping the recording of the moving image data on another recording medium, and
wherein the control unit, if one of the last clips of the plurality of recording media is recorded in the second mode, erases the last clip of the one recording medium in response to the erasure instruction of the last clip.

5. The recording apparatus according to claim 1, wherein the control unit controls the output unit to display information about recording speeds of the plurality of recording media on the selection screen.

6. A recording apparatus comprising:
an input unit configured to input moving image data;
a recording unit configured to record the moving image data input by the input unit on a first recording medium and a second recording medium;
an output unit configured to output information to a display device;
a selection unit configured to select one of a plurality of modes including a first mode for simultaneously recording the moving image data input by the input unit on the first recording medium and the second recording medium; and
a control unit configured, if moving image data of a last clip which is recorded lastly among a plurality of clips recorded on the first recording medium and the second recording medium is recorded in the first mode, to control the output unit to output a selection screen for selecting one of the first recording medium and the second recording medium or both the first recording medium and the second recording medium, and erase the moving image data of the last clip from the selected recording medium,
wherein, the control unit, if one of the first recording medium and the second recording medium is selected, erases the moving image data of the last clip from the one of the first recording medium and the second recording medium and prohibits erasure of the moving image data of the last clip from the other of the first recording medium and the second recording medium and, if both the first recording medium and the second recording medium are selected, erases the moving image data of the last clip from each of both the first and second recording media.

7. The apparatus according to claim 6, wherein the control unit discriminates whether the image data of the last recorded clip recorded on each of the first recording medium and the second recording medium is recorded in the first mode by using mode information for identifying whether the moving image data recorded on the first recording medium and the moving image data recorded on the second recording medium are recorded in the first mode and last clip information for identifying the moving image data of the last clip.

8. The apparatus according to claim 7, wherein the control unit stores the mode information and the last clip information in a memory, and discriminates whether the image data of the last clip recorded on each of the first recording medium and the second recording medium is recorded in the first mode by using the mode information and last clip information stored in the memory.

9. The apparatus according to claim 7, wherein the plurality of modes include a second mode for recording the input moving image data on one recording medium of the first recording medium and the second recording medium and stopping the recording of the moving image data on another recording medium, and
wherein, if the control unit discriminates that one of the last clips of the first recording medium and the second recording medium is recorded in the second mode, the control unit erases the last clip of the one recording medium in response to an instruction for erasing of the last clip.

10. A recording method comprising:
an input step of inputting moving image data;
a recording step of recording the moving image data input by the input step on a plurality of recording media;
an output step of outputting information to a display device;
a selection step of selecting any of a plurality of modes including a first mode for simultaneously recording the moving image data input by the input step to the plurality of recording media; and a control step of, if moving image data of a last recorded clip which is recorded lastly among a plurality of clips recorded on each of the plurality of recording media is recorded in the first mode, controlling the output step to output a selection screen for selecting any of the plurality of recording media, and erasing the moving image data of the last clip from the selected recording medium from the plurality of recording media displayed on the selection screen, and a storing step of storing mode information for identifying whether the moving image data recorded on the plurality of recording media is recorded in the first mode and last clip information for identifying the moving image data of the last clip in a memory, wherein the control step determines, if an instruction for erasing the last clip is issued, whether each of the image data of the last clips of the plurality of recording media is recorded in the first mode by using the mode information and the last clip information stored in the memory.

11. A recording method comprising:

an input step of inputting moving image data;

a recording step of recording the moving image data input by the input step on a first recording medium and a second recording medium;

an output step of outputting information to a display device;

a selection step of selecting one of a plurality of modes including a first mode for simultaneously recording the moving image data input by the input step on the first recording medium and the second recording medium; and a control step of, if moving image data of a last clip which is recorded lastly among a plurality of clips recorded on the first recording medium and the second recording medium is recorded in the first mode, controlling the output step to output a selection screen for selecting one of the first recording medium and the second recording medium or both the first recording medium and the second recording medium, and erasing the moving image data of the last clip from the selected recording medium, wherein, the control step, if one of the first recording medium and the second recording medium is selected, erases the moving image data of the last clip from the one of the first recording medium and the second recording medium and prohibits erasure of the last clip from the other of the first recording medium and the second recording medium and, if both the first recording medium and the second recording medium are selected, erases the moving image data of the last clip from each of both the first and second recording media.

* * * * *